United States Patent
Lapointe et al.

(10) Patent No.: US 7,046,693 B1
(45) Date of Patent: May 16, 2006

(54) METHOD AND SYSTEM FOR DETERMINING AVAILABILITY IN NETWORKS

(75) Inventors: Darlene Lapointe, Ottawa (CA); Martin Lavigne, Cantley (CA); Karla R. Boskers, Ottawa (CA); Frederic Ashby, Hull (CA)

(73) Assignee: Nortel Networks Limited, Quebec (CA)

(*) Notice: Subject to any disclaimer, the term of this patent is extended or adjusted under 35 U.S.C. 154(b) by 925 days.

(21) Appl. No.: 09/984,700

(22) Filed: Oct. 31, 2001

(51) Int. Cl.
*G08C 15/00* (2006.01)

(52) U.S. Cl. ............... 370/468; 370/465; 370/252; 370/241.1; 370/236.2; 370/350; 370/395.62

(58) Field of Classification Search ............ 370/263.2, 370/241.1, 252, 465, 468
See application file for complete search history.

(56) References Cited

U.S. PATENT DOCUMENTS

| | | | |
|---|---|---|---|
| 5,835,721 A * | 11/1998 | Donahue et al. ............ 709/224 |
| 6,058,102 A | 5/2000 | Drysdale et al. |
| 6,816,475 B1 * | 11/2004 | Pattavina ................ 370/336 |
| 6,891,852 B1 * | 5/2005 | Cloutier et al. ........... 370/468 |
| 2001/0002909 A1 | 6/2001 | Iwamoto ................. 370/395 |
| 2002/0009054 A1 * | 1/2002 | Suzuki et al. ............. 370/252 |
| 2002/0085499 A1 * | 7/2002 | Toyoyama et al. ....... 370/236.2 |
| 2004/0202112 A1 * | 10/2004 | McAllister et al. ........ 370/252 |

FOREIGN PATENT DOCUMENTS

| | | |
|---|---|---|
| EP | 0 702 495 A1 | 3/1996 |
| JP | 10 065685 | 3/1998 |

OTHER PUBLICATIONS

Telecommunication Standardization Section of ITU: "ITU-T Recommendation I.610" ITU-T Telecommunication Standardization Sector of ITU, Geneva, CH, Nov. 1, 1995, 25 pages total.

Osmani A. et al.: "Model-Based Diagnosis for Fault Management in ATM Networks" ATM, 1999. ICATM '99, 1999 2nd International Conference on Colmar, France Jun. 21-23, 1999, Piscataway, NJ, USA, IEEE, US Jun. 21, 1999, pp. 91-99.

Gruber J.: "Performance and Fault Management Functions for the Maintenance of SONET/SDH and ATM Transport Networks" Proceedings of the International Conference on Communications (ICC). Geneva, May 23-26, 1993, New York, IEEE, US, vol. 3, May 23, 1993, pp. 1308-1314.

* cited by examiner

*Primary Examiner*—Chi Pham
*Assistant Examiner*—Christopher Grey (57) ABSTRACT

Availability in a segment of a communications network between two terminating devices periodically transmitting a data packet over the segment is determined. The two terminating devices receive transmitted data packets according to an expected arrival format for data packets. The segment is monitored over a monitoring time interval for continuity of the expected arrival format. An unavailable time after a change in arrival format of data packets from the expected arrival formal to a change in arrival format of data packets back to the expected arrival format is detected. An available time interval based on the monitoring time interval and the unavailable time interval is determined.

31 Claims, 4 Drawing Sheets

METHOD AND SYSTEM FOR DETERMINING AVAILABILITY IN NETWORKS

FIELD OF THE INVENTION

The present invention relates to measuring quality of service in broadband telecommunications systems, and more particularly to estimating availability in networks.

BACKGROUND OF THE INVENTION

Asynchronous transfer mode (ATM) communications infrastructure has become widely deployed in the core of most telecommunications carrier's networks. Over time a greater variety of communications services and a growing volume of traffic is moving over these ATM networks. The commercial end users—businesses and institutions—are relying more and more on these ATM networks to support and implement their business critical systems.

Although ATM technology was specifically designed to allow the networks to provide a high level of service quality and reliability, ATM like all other networking technologies is subject to certain types of degradation and failure. Following a practice that is well established in time division multiplexing and in frame relay, commercial end users of ATM networks are demanding specific, contractually enforceable guaranties of performance quality from the network operators. These guaranties often take the form of service level agreements (SLA).

In order for the network operators to better report compliance to the SLA, telecom equipment manufacturers, often through participation in working groups within standards bodies, have sought to define methods for measuring several key SLA components. The performance of an ATM network can be measured by evaluating four parameters: availability ratio (AR), cell loss ratio (CLR), cell transfer delay (CTD) and cell delay variance (CDV).

Determination of AR and availability has typically used the measurement of severely errored seconds (SES) as the basis for evaluating availability. Measurement of SES occurs at the data link layer of an ATM network. As such, methods based on SES are dependent on the level of user traffic for accuracy and require a high level of computing intensity at each measurement point. In addition, the solutions recommended have, in some cases, applied to a limited set of connection types.

Efforts have been made to determine availability at higher levels in a network, such as the transport layer. A typical implementation includes the insertion of hardware based probes in-line with the connections to be monitored. These solutions often also include the injection of signaling message cells into the user data streams on the connections. The relatively high cost and complexity of probe deployment together with the impact of augmenting user data traffic has proved to be objectionable. Further, such solutions do not provide the ability to offer bi-directional availability measurements.

SUMMARY OF THE INVENTION

Availability in a segment of a communications network between two terminating devices periodically transmitting a data packet over the segment is determined. The two terminating devices receive transmitted data packets according to an expected arrival format for data packets. The segment is monitored over a monitoring time interval for continuity of the expected arrival format. An unavailable time after a change in arrival format of data packets from the expected arrival format to a change in arrival format of data packets back to the expected arrival format is detected. An available time interval based on the monitoring time interval and the unavailable time interval is determined.

In accordance with one aspect of the present invention there is provided a method of determining availability in a segment of a communications network between two terminating devices periodically transmitting a data packet over the segment, the two terminating devices receiving the periodically transmitted data packets according to an expected arrival format for data packets, said method comprising: monitoring the segment over a monitoring time interval for a change in arrival format of data packets from the expected arrival format; detecting an unavailable time interval after a change in arrival format of data packets from the expected arrival format to a change in arrival format of data packets back to the expected arrival format; and determining an available time interval based on said monitoring time interval and said unavailable time interval.

In accordance with another aspect of the present invention there is provided in a terminating device, a system for determining availability in a segment of a communications network between the terminating device and another terminating device, both terminating devices periodically transmitting a data packet over the segment, both terminating devices receiving the periodically transmitted data packets according to an expected arrival format for data packets, said system comprising: a controller for monitoring arrival of data packets from the segment over a monitoring time interval for a change in arrival format of data packets; means for detecting an unavailable time interval after a change in arrival format of data packets from the expected arrival format to a change in arrival format of data packets back to the expected arrival format; and an availability determination function for determining an available time interval based on said monitoring time interval and said unavailable time interval.

In accordance with a further aspect of the present invention there is provided a computer readable medium having stored thereon computer-executable instructions for determining availability in a segment of a communications network between two terminating devices periodically transmitting data packet over the segment, the two terminating devices receiving the periodically transmitted data packet according to an expected arrival format for data packets, the computer-executable instructions comprising: monitoring the segment over a monitoring time interval for a change in arrival format of data packets from the expected arrival format: detecting an unavailable time interval after a change in arrival format of data packets from the expected arrival format to a change in arrival format of data packets back to the expected arrival format; and determining an available time interval based on said monitoring time interval and said unavailable time interval.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be described in conjunction with the drawings in which.

DETAILED DESCRIPTION OF EMBODIMENTS OF THE PRESENT INVENTION

Figure 1:
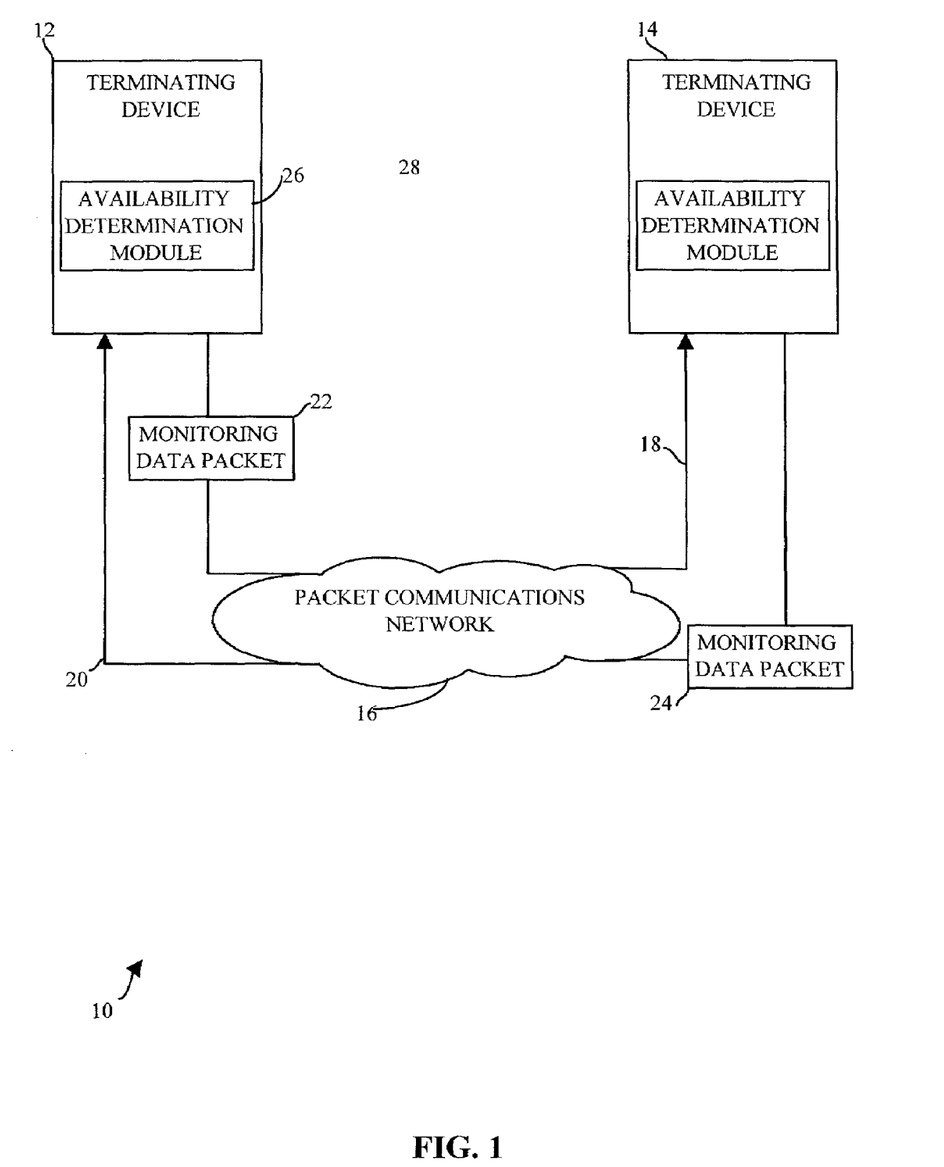
FIG. 1 is a system diagram for a system that estimates communications segment availability according to an embodiment of the present invention.

A system 10 for estimating availability for communications segments according to an embodiment of the present invention is illustrated in FIG. 1. The system 10 includes two terminating devices 12,14 and a packet communications network 16 to facilitate communications between the two terminating devices 12,14. The system 10 may, for example, determine availability for bi-directional ATM segments. The switching network 16 may be, for example, an ATM switching network, a frame relay network, an internet protocol network, or any other packet-based network.

A first terminating device 12 is connected to a second terminating device 14 via a first communications segment 18. The second terminating device 14 is connected to the first terminating device 14 via a second communications segment 20. The communications segments 18,20 can be included in, for example, a permanent virtual circuit, a permanent virtual path, a switched virtual circuit or a switched virtual path. Each of the communications segments 18,20 supports unidirectional data transmission where the directionality is indicated by an arrowhead at the terminating devices 12, 14. The term segment refers to logical connections and can include segments and connections.

The terminating devices 12, 14 may be, for example, nodes of a larger network. The terminating devices 12, 14 may be, for example, switching nodes in an ATM communications network. For illustrative purposes, only two terminating devices 18,20 are shown in FIG. 1. However, it will be understood that the system 10 can include numerous terminating devices, wherein each terminating device 18,20 is generally connected to multiple other terminating devices via corresponding communications segments.

The terminating devices 12, 14 transmit monitoring data packets 22,24 via the communications segments 18,20 to each other on a periodic basis. The monitoring data packets 22,24 are data packets that can be used for performance monitoring and management of the communications segments 18,20. These data packets 22,24 are used by the terminating devices 12,14 to monitor the continuity of data packet flow through the segments 18,20. The monitoring of these data packets 22,24 assists the terminating devices 12,14 in detecting when there is a loss of continuity of data packet flow in the segments 18,20. For example, these data packets 22, 24 can include operation and maintenance (OAM) cells for use in an ATM communications network.

The term packet does not imply any particular transmission protocol but refers to a segment of data packaged for transmission over a communications segment using any of a number of different data transmission protocols.

The monitoring data packets 22, 24 are periodically transmitted from one of the terminating devices 12, 14 on one of the communications segments 18, 20. These data packets 22, 24 are used for continuously monitoring continuity of traffic travelling across the communications segments 18, 20. These data packets 22,24 are continuously transmitted and detected by the terminating device 12,14 receiving the data packets 22,24 and provide an indication of whether the communications segment 18,20 is idle or has a loss of continuity (i.e. experiencing congestion severed connection, experiencing data loss, etc.). For example, the monitoring data packets 22,24 can include OAM cells of a continuity check (CC) type that may be transmitted every second.

Each of the terminating devices 12, 14 has on availability determination module 26, 28 for detecting the arrival of the monitoring data packets 22,24 and determining the availability of the segments 18,20 based on arrival of these data packets 22,24. The availability determination modules 26,28 reside on existing terminating devices 12,14 as a performance monitoring application.

Figure 2:
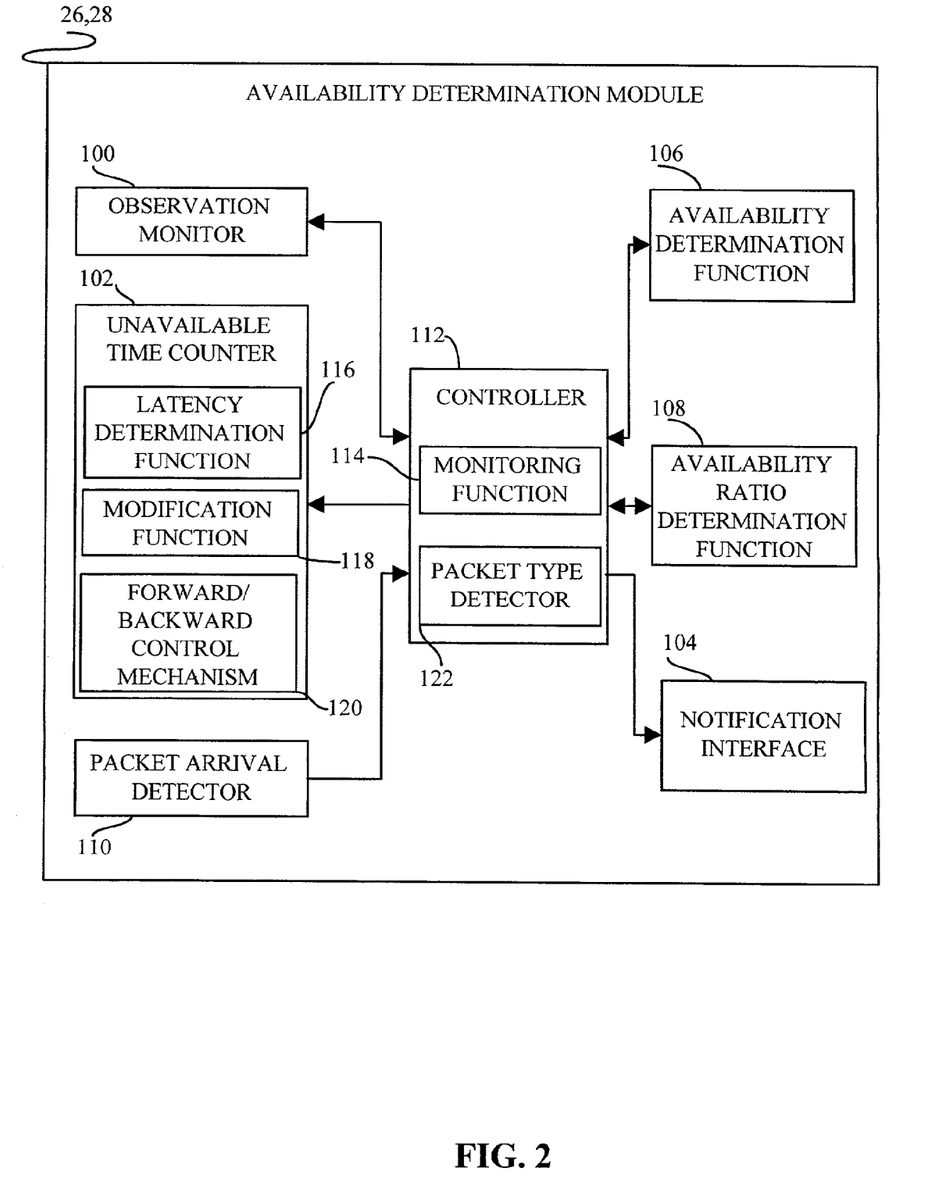
FIG. 2 is a system diagram of an availability determination module of FIG. 1.

FIG. 2 is a system diagram of the availability determination modules 26,28 according to an embodiment of the present invention. The availability determination module 26,28 has a controller 112 for coordinating and controlling other components of the module 26,28.

A packet arrival detector 110 detects data packets received via the communications segment 18,20 terminating on the corresponding terminating device 12,14. The packet arrival detector 110 informs the controller 112 when a data packet has been received at the terminating device 12,14. The controller 112 has a monitoring function 114 that receives the data packets. The monitoring function 114 has a predetermined time interval during which it expects to receive a data packet from the incoming communications segment 18,20. The monitoring function 114 has an expected format for data packet arrival, i.e. it expects to receive data packets in the predetermined time interval. This time interval may correspond with the interval at which the monitoring data packets 22,24 are transmitted. Alternatively, the predetermined time interval may be greater than the interval at which the monitoring data packets 22,24 are sent to make allowance for packet forwarding delay in the network 16. For example, the predetermined time interval may be 3.5 seconds within a range of 0.5 seconds.

The controller starts an observation monitor 100 to measure the time during which the arrival of data packets is monitored. This time is the observation time interval.

If a data packet, including the monitoring data packets 22,24, has not been received during the predetermined time interval this indicates that outgoing communications segment 18,20 transmitting the data packets at the terminating device 12,14 has a loss of continuity. Loss of continuity is considered to be similar to unavailability. That is, loss of continuity is taken to mean that transmitted data packets are not consistently reaching the end of the segment. Therefore, there is a change in arrival format from the expected format since data packets are not being received in the predetermined time interval.

The terminating devices 12,14 have two states to indicate the status of the communications segment 18,20: available and unavailable. An availability measurement of the segments 18,20 can be considered to be the fraction of time during which the segments 18,20 are able to support a transaction or the transmission of data packets. An unavailability measurement of the segments 18,20 is the fraction of time during which the segments 18,20 cannot support a transaction or the transmission of data packets. The available and unavailable states correspond to the ability or inability, respectively, of the terminating devices 12,14 to sustain a connection to each other using the segments 18,20 for the purposes of transmitting data packets. That is, a loss of continuity in the segments 18,20 indicates that the segments 18,20 are in an unavailable state. The controller 112 sets the state of the segments 18,20 according to changes in a format of arriving data packets. When the arrival format is the expected format then the segments 18,20 are available but when there is a change in the arrival format from the expected format then the segments 18,20 are unavailable.

The monitoring function 114 monitors time after the arrival of a data packet to determine when the predetermined time interval has expired without the arrival of another data packet during that time. After the expiration of the predetermined time interval, the controller 112 passes the predetermined time interval to an unavailable time counter 102. The unavailable time counter 102 measures or detects the time for which the segment 18,20 is unavailable or is experiencing a loss of continuity using the predetermined time interval as the starting point for counting. If the segment 18,20 was last available in a time smaller than the predetermined interval then an interval since the last available state may be used as the starting point for counting the unavailable time. The determination of the starting point for counting is made by a latency determination function 116 according to a time since the last state change. The latency determination function 116 determines a latency time interval between a detection of a loss of continuity and when continuity was actually lost (e.g. the current time less the predetermined time interval). Changes to the unavailable time count due to latency are made by a modification function 118. When the controller 112 receives another data packet from the packet arrival detector 110, thus indicating that the segment 18,20 is no longer experiencing a loss of continuity, the unavailable time counter 102 stops counting according to control by the controller 112.

The controller 112 invokes a notification interface 104 to transmit a notification message (not shown) back to the terminating device 12, 14 from which data packets have not been received. The notification message informs the terminating device 12,14 that expected data packets, such as the monitoring data packets 22,24, have not been received. The outgoing segment 18,20 of the terminating device 12, 14 receiving the notification message has a loss of continuity and therefore is unavailable. The notification message allows the terminating device 12,14 whose outgoing segment 18,20 has a loss of continuity to be informed of this situation. The notification message may be sent periodically from the time the condition is detected until the condition is cleared (i.e. data packets are being received again). Alternatively, a single message may be sent when the loss of continuity is first recognized and when continuity returns (i.e. data packets are being received again). The notification message may be, for example, a remote defect indication (RDI) cell in an ATM environment.

A packet type detector 122 in the controller 112 monitors for and determines a packet type for a received data packet. The data packet may be a monitoring data packet, a notification message or may contain user data. The type of data packet may be used to monitor continuity for multiple segments from a single terminating device.

Alternatively, the terminating devices 12,14 may be configured such that one of the terminating devices 14 defines a near-end of the connection and transmits data packets on the segment 18 in a forward direction. The other of the terminating devices 14 may be configured to be a far-end of tie connection and transmits data packets on the segment 20 in a backward direction. For such a configuration, a loss of continuity (i.e. no data packets going completely through the segment 18) on the forward direction may be handled as described above with the far-end detecting the condition and sending a notification message to the near-end terminating device 12. The near-end terminating device 12 determines the state of its outgoing segment 18 according to notification messages from the far-end terminating device 14. Counting of unavailable time for the outgoing segment 18 may be controlled according to receipt (or lack of receipt) of notification messages. For a loss of continuity in the backward direction, the near-end terminating device 12 detects the situation and the far-end transmitting segment 20 would be placed in an unavailable state by the near-end terminating device 12.

Changing the unavailable state to the available state occurs at both the near-end and the far-end terminating devices 12,14 and is the reverse of the setting of the unavailable state. For the near-end terminating devices 12 when a data packet (possibly a monitoring data packet 22) is received by the far-end terminating device 14, transmission of notification messages therefrom ceases. The near-end terminating device 12 sets the available state at a change dime interval after the last notification message is received For the far-end terminating device 14, when the near-end terminating device 12 receives a data packet (possibly a monitoring data packet 24) from the far-end terminating device 14, the outgoing communications segment 20 is set to the available state by the near-end terminating device 12.

When there is a loss of continuity in both the forward and the backward directions, the near-end terminating device 12 sets the state according to the presence or absence of data packets being received through the communications segments 18,20.

In the example of the near-end and far-end terminating device 12,14, the availability determination module 26,28 in each device 12,14 may contain different components of the modules 26,28 shown in FIG. 2. For example, the module 26 in the near-end terminating device 12 may contain an observation monitor 100; a packet arrival detector 110; an availability determination function 106; an availability ratio determination function 108; a controller 112 with a monitoring function 114 and a packet type detector 122; and an unavailable time counter 102 with a latency detection function 116, a modification function 118 and a forward/backward control mechanism 120. The forward/backward control mechanism 120 assists in the detection of unavailable time for the outgoing segments 18,20 of both the near-end and the far-end terminating device 12,14. The forward/backward control mechanism 120 measures unavailable time for both segments 18,20 and can determine a combined unavailable time to be used for determining overall available time for the bi-directional segment made UP of the two outgoing segments 18,20.

The module 28 in the far-end terminating device 14 may contain, for example, a packet arrival detector 110. A controller 112 with a monitoring function 114 and a notification interface 104. As the near-end terminating device 12 sets the availability/unavailability of both segments 18,20, the far-end terminating device 14 is used for detecting a loss of continuity of the outgoing segment 18 from the near-end terminating device 12. When a loss of continuity is detected on the segment 18 a notification message is sent to the near-end terminating device 12 where this condition is monitored.

In the case where each availability determination module 26,28 monitors availability for outgoing segment 18,20 of the terminating device 12,14 on which it is present, the availability determination modules may contain, for example, an observation monitor 100; a packet arrival detector 110; an availability determination function 106; an availability ratio determination function 108; a controller 112 with a monitoring function 114 and a packet type detector 122; an unavailable time counter 102 with a latency detection function 116 and a modification function 118; and a notification interface 104.

In the case where each availability determination module 26,28 monitors availability for the incoming segment 18,20 of the terminating device 18,20 on which it is present, the availability determination modules 26,28 may contain, for example, an observation monitor 100; a packet arrival detector 110; an availability determination function 106; an availability ratio determination function 108; a controller 112 with a monitoring function 114 and a packet type detector 122; and an unavailable time counter 102 with a latency detection function 116 and a modification function 118.

The controller 112 also interfaces with an availability determination function 106 and an availability ratio determination function 108 for determining availability measurements for the segment 18,20. The availability determination function 106 uses a measurement of the time that the segment 18,20 at the terminating device 12,14 was unavailable as determined by the unavailable time counter 102. From this measurement of unavailability and a total observation time from the observation monitor 100 a measurement of the time that the segment 18,20 was available can be determined. The available time is the difference between the total observation time and the unavailable time. The availability ratio determination function 108 finds the availability ratio using the total observation time and the available time. The availability ratio is the time that the segment was available to the total observation time.

The latency detector 116 determines two latencies: a change latency and a restore latency. The change latency is the interval between a change from the expected arrival format and a time of change from the expected arrival format. That is, the change latency is the time between when there is a loss of continuity and when the loss of continuity is detected. The restore latency is the interval between a change of a return to the expected arrival format and a time of change to a return of the expected arrival format. That is, the restore latency is the time between when continuity returns and when the returning of the continuity is detected.

The terminating devices 12,14 may perform both the functions of transmitting monitoring data packets 22,24 periodically and monitoring for transmitted data packets 22, 24 as the communications segments 18,20 form a bi-directional connection between the devices 12,14.

Figure 3:
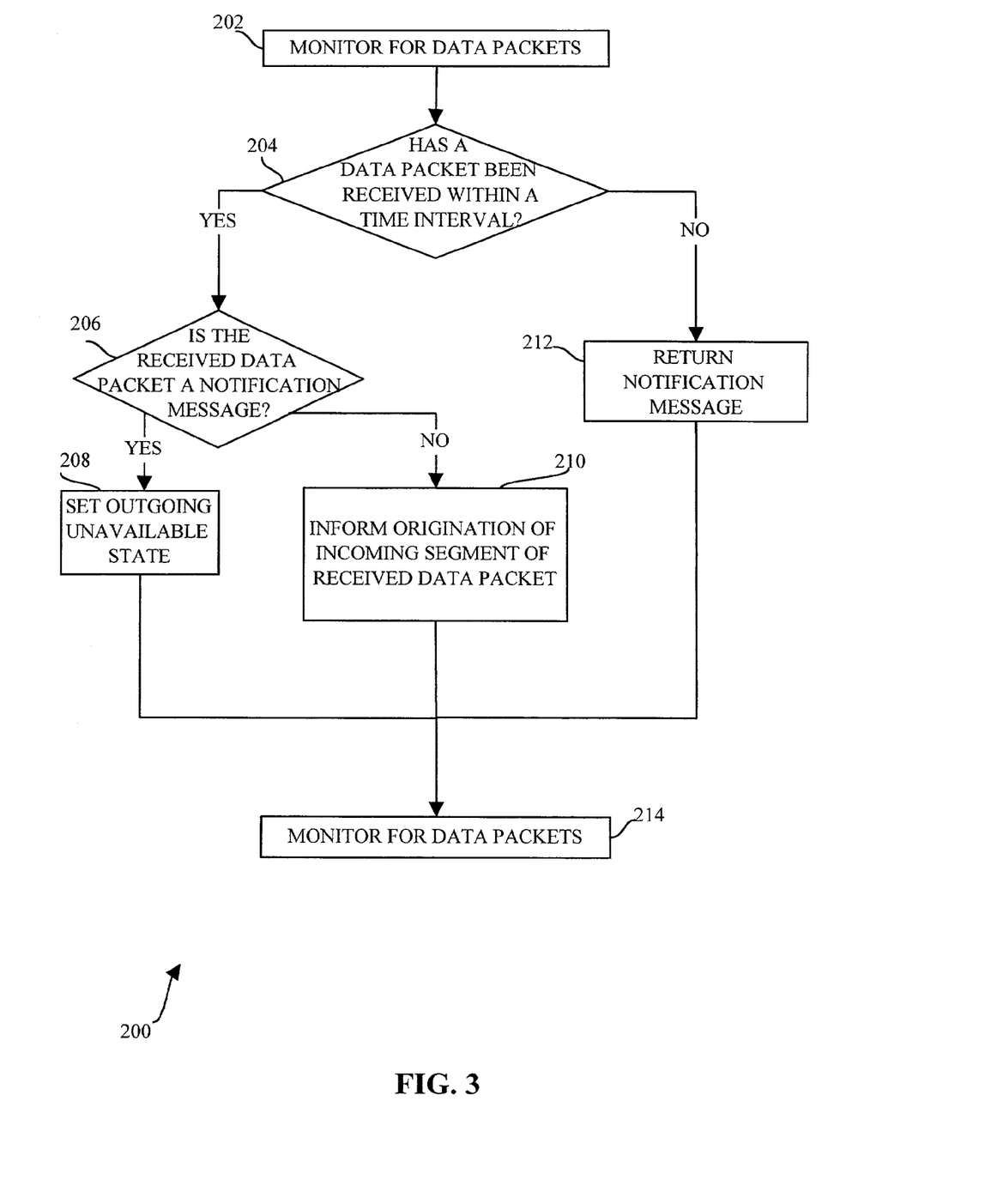
FIG. 3 is a flow diagram for availability detection in the availability determination module of FIG. 1.

FIG. 3 illustrates a flow diagram 200 representing availability detection in the availability determination module 26,28 The availability determination modules 26,28 monitor the terminating devices 12,14 to determine if any data packets have been received from the communications segments 18,20 in step 202. The availability determination modules 26,28 determine if a data packet of any type has been received within a predetermined time interval in step 204. If no data packets have been received within the predetermined time interval then a notification message is sent to the terminating device 12,14 for which expected transmissions have not been received in step 212 in the case where a terminating device 12,14 monitors availability for its outgoing segment 18,20. If a terminating device 12,14 monitors availability for an incoming segment 18,20 then the state for that segment 18,20 is set to unavailable.

The notification message indicates to the terminating device 12,14 receiving the notification message that its outgoing communications segment 19,20 has a loss of continuity. After the notification message has been sent the availability determination modules 26,28 return to a state of monitoring for incoming data packets in step 214.

If data packets have been received by the terminating device 12, 14 within the predetermined tine interval, then the availability determination modules 26, 28 determine if the data packet was a notification message in step 206. If a terminating device 12,14 is monitoring availability for an incoming segment 18,20 then the state for that segment 18,20 is set to available. As the connection between the devices 12,14 is bi-directional, the devices 12,14 can both transmit monitoring data packets 22,24 and monitor for monitoring data packets 22,24. If the received data packet is a notification message then the outgoing communications segment 18,20 corresponding to the communications segment 18,20 from which the notification message was received is considered to be in the unavailable state in step 208. If the received data packet is not a notification message in the case where terminating devices 12,14 monitors outgoing segments 18,20, the terminating device 12,14 from which the received data packets originates is informed of the arrival of a data packet if the terminating device 12,14 was recently informed of a loss of continuity in step 210. The outgoing communications segment 18,20 is set to an available state either with step 208 or step 210 depending on how the notification message is transmitted (e.g. continuously until continuity returns, only at the beginning and end of loss of continuity, etc.). After the states have been set in steps 208 and 210 then the monitoring function continues to monitor for data packets in step 214.

Figure 4:
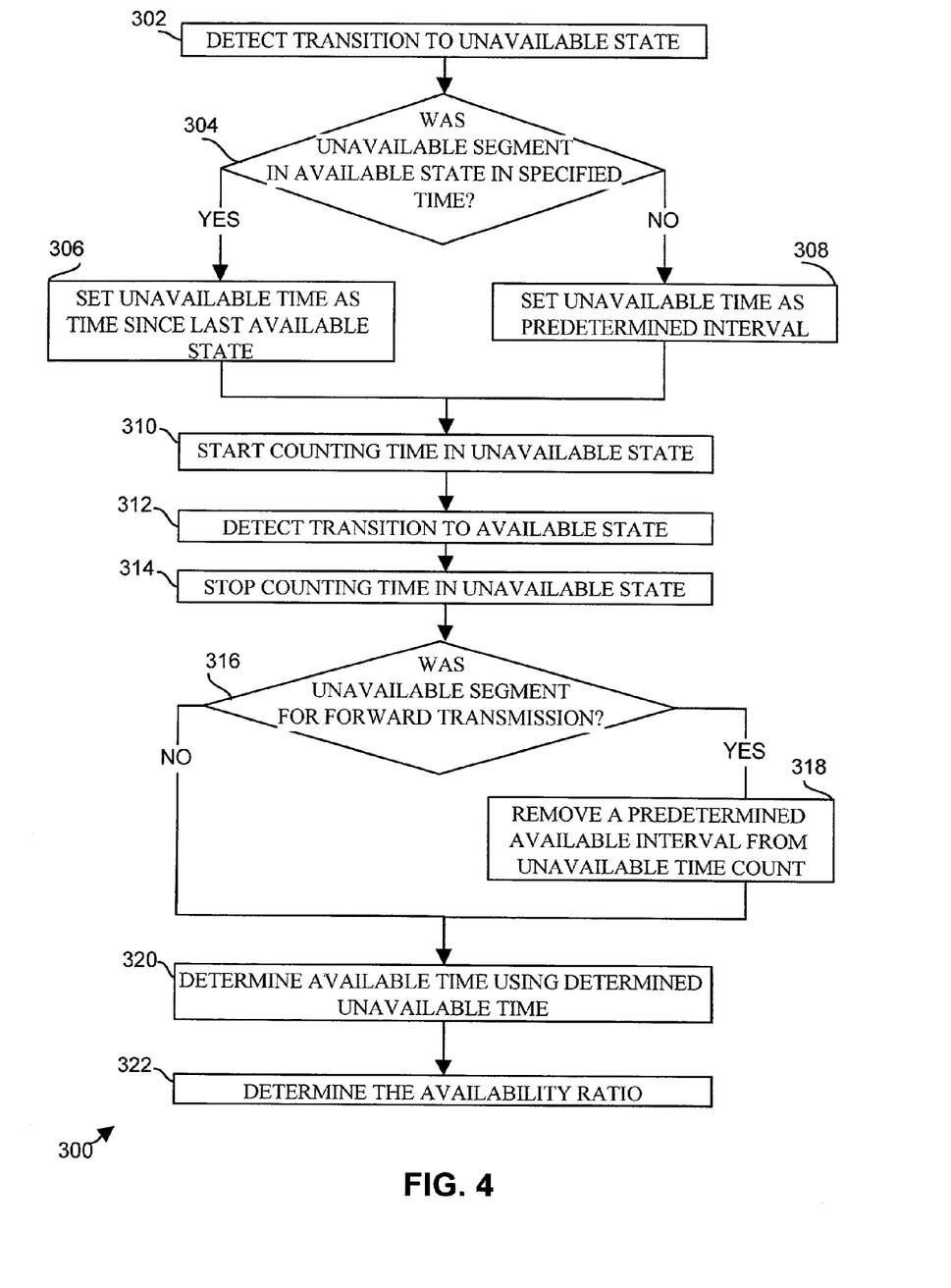
FIG. 4 is a flow diagram for an availability determination in the availability determination module of FIG. 1.

FIG. 4 illustrates a flow diagram 300 representing the determination of the availability ratio in the availability determination module 26,28. For determining the availability ratio the transitions into and out of the unavailable state are monitored. Transition of the communications segments 18,20 to the unavailable state is detected in step 302. In step 304 it is determined whether or not the last available state for the transitioned segment 18,20 was within a predetermined transition interval. If the segment 18,20 was last available in a time smaller than the predetermined transition interval then the time since the last available state is set as a starting point for counting unavailable time in step 306. If the time since the segment 18,20 was last in the available state is greater than or equal to the predetermined transition interval then the predetermined transition interval is set as the starting point for counting unavailable time in step 308. That is, the change latency may be used as the starting point for counting time that the segment is in the unavailable state. The time that the segment 18,20 is in the unavailable state is counted in step 310.

Transition of the communications segment 18,20 from the unavailable state is detected in step 312. Counting of time that the segment 18,20 is in the unavailable state is stopped in step 314. In step 316 it is determined if the segment 18,20 that was in the unavailable state transmitted in a forward direction. If the segment 18,20 was outgoing from a near-end terminating device 12,14 (i.e. transmitted in a forward direction) then a predetermined available time interval is removed from the stopped count of the time in the unavailable state in step 318. The predetermined available time interval accounts for the latency in detecting the cessation of the notification messages being transmitted from the far-end terminating device 12,14 to the near-end terminating device 12,14 informing the near-end terminating device 12,14 that the fault on the outgoing segment 18,20 has been cleared. This latency is the restore latency.

After the time that the segment 18,20 was in the unavailable state has been determined, the time in the available state can be determined in step 320. The time in the available state is the total observation lime less the time spent in the unavailable state.

The availability ratio is determined in step 322 using the time in the available state and the total observation time. The availability ratio is the time in the available state to the total observation time.

The same mechanisms described above apply where the unavailable state for a bi-directional segment is a function of the unavailable state for each of the two segments 18,20. Time in the available state and the availability ratio can be determined in a similar manner for the bi-directional segment.

The availability ratio is used to monitor performance and quality in a network. The present invention takes advantage of data packets that may already be used to monitor continuity in a network to determine availability. This allows availability to be determined at the level where packets are transmitted rather than at lower levels.

Embodiments of the present invention may be implemented in any conventional computer programming language. For example, embodiments may be implemented in a procedural programming language (e.g. "C") or an object oriented language (e.g. "C++"). Further embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g a diskette, CD-ROM, ROM, or fixed disk) or transmittable to a computer system, via a modem or other interface device, such as a communications adapter connected to a network over a medium. The medium may be either a tangible medium (e.g. optical or electrical communications lines) or a medium implemented with wireless techniques (e.g. microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g. shrink wrapped software), preloaded with a computer system (e.g. on system ROM or fixed disk), or distributed from a server over the network (e.g. the Internet or World Wide Web). Some embodiments of the invention may be implemented as a combination of both software (e.g. a computer programs product) and hardware. Still other embodiments of the invention may be implemented as entirely hardware, or entirely software (e.g. a computer program product)."

It is apparent to one skilled in the an that numerous modifications and departures from the specific embodiments described herein may be made without departing from the spirit and scope of the invention.

What is claimed is:

1. A method of determining availability in a bi-directional segment connecting two terminating devices in a communications network, the two terminating devices periodically transmitting and receiving data packets, the periodically transmitted data packets being received according to an expected arrival format said method comprising:

monitoring a first direction of the segment over a monitoring time interval to detect a change in arrival format of the periodically transmitted data packets from the expected arrival format;

monitoring the first direction to detect a notification message indicating a change in arrival format of the periodically transmitted data packets from the expected arrival format for a second direction of the segment;

detecting an unavailable time interval between the detected change in arrival format from the expected arrival format to a detected change in arrival format of data packets back to the expected arrival format for at least one of the first direction and the second direction of the segment;

modifying the unavailable time interval to remove a predetermined interval representing a latency between the change in arrival format and detection of the change in arrival format; and determining an available time interval for the bi-directional segment based on a difference between said monitoring time interval and said modified unavailable time interval.

2. The method of claim 1 wherein said step of monitoring includes:

monitoring the segment over said monitoring time interval to detect arrival of data packets in a predetermined time interval, wherein the arrival of data packets in said predetermined time interval represents the expected arrival format.

3. The method of claim 2 wherein said step of monitoring the segment for includes:

monitoring the segment over said monitoring time interval to detect arrival of monitoring data packets periodically transmitted from the two terminating devices to monitor continuity of the segment.

4. The method of claim 1 further including:

transmitting a notification message from one of the two terminating devices to the other of the two terminating devices when the arrival format changes from the expected arrival format.

5. The method of claim 1 wherein said step of monitoring includes:

monitoring the segment at a first terminating device of the two terminating devices to detect a change in arrival format of the data packets from a second terminating device of the two terminating devices; and said step of detecting includes:

detecting a second unavailable time interval at said first terminating device for the first direction of the segment on which said second terminating device transmits data packets.

6. The method of claim 5 wherein said step of monitoring further includes:

monitoring the second direction of the segment at said second terminating device to detect a change in arrival format of data packets from said first terminating device; said method further including:

transmitting a notification message from said second terminating device to said first terminating device when a change in arrival format of data packets from said first terminating device is detected.

7. The method of claim 6 wherein said step of detecting includes:
detecting a first unavailable time interval at said first terminating device for the second direction of the segment on which said first terminating device transmits data packets based on said notification message.

8. The method of claim 7 wherein the step of detecting an unavailable time interval further includes:
determining said unavailable time interval based on said first unavailable time interval and said second unavailable time interval.

9. The method of claim 1 wherein said step of detecting an unavailable time interval includes:
determining a change latency interval between a time of detection of a change from the expected arrival format and a time of change from the expected arrival format; and
determining a restore latency interval between a time of detection of a change of a return to the expected arrival format and a time of change to a return of the expected arrival format;
wherein said latency includes the change latency and the restore latency.

10. The method of claim 1 further comprising:
determining an availability ratio of said available time interval to said monitoring time interval.

11. The method of claim 4 wherein the communications network is an asynchronous transfer mode (ATM) communications network, the periodically transmitted data packets from the two terminating devices are operations administration and maintenance (OAM) cells, said notification message is a remote defect indicator (RDI) cell, and the terminating devices are switching nodes and the step of monitoring the segment includes:
monitoring over said monitoring time interval to detect arrival of OAM cells for a loss of continuity.

12. A system in a terminating device for determining availability in a bi-directional segment connecting the terminating device with another terminating device in a communications network, both terminating devices periodically transmitting and receiving data packets, the periodically transmitted data packets being received according to an expected arrival format, said system comprising:
a controller for monitoring arrival of the periodically transmitted data packets from a first direction of the segment over a monitoring time interval to detect a change in arrival format of data packets, and for monitoring the first direction to detect a notification message indicating a change in arrival format from the expected arrival format for a second direction of the segment;
means for detecting an unavailable time interval between the detected change in arrival format of data packets from the expected arrival format to a detected change in arrival format of data packets back to the expected arrival format for at least one of the first direction and the second direction of the segment;
a modification function for modifying said unavailable time interval to remove a predetermined interval representing a latency between the change in arrival format and detection of the change in arrival format; and
an availability determination function for determining an available time interval for the bi-directional segment based on a difference between said monitoring time interval and said modified unavailable time interval.

13. The system of claim 12 wherein the controller includes:
a monitoring function for monitoring the segment over said monitoring interval to detect arrival of data packets in a predetermined time interval to monitor continuity of the segment, wherein the arrival of data packets in said predetermined time interval represent the expected arrival format.

14. The system of claim 12 further including:
an observation monitor for determining said monitoring time interval.

15. The system of claim 12 further including:
a notification interface for transmitting a notification message to the other transmitting device when the arrival format changes from the expected arrival format.

16. The system of claim 12 further including:
a packet arrival detector for detecting arrival of packets at one of the two terminating devices.

17. The system of claim 12 further including:
an availability ratio determination function for determining an availability ratio of said available time interval to said monitoring time interval.

18. The system of claim 13 wherein said monitoring function includes:
means for monitoring to detect a notification message; and
means for monitoring to detect monitoring data packets periodically transmitted from the two terminating devices to monitor continuity of the segment.

19. The system of claim 18 wherein said means for determining an unavailable time interval includes:
means for detecting a first unavailable time interval based on receipt of said notification message, said first unavailable time interval being for the second direction of the segment;
means for detecting a second unavailable time interval based on receipt of monitoring data packets, said second unavailable time interval being for the first direction of the segment; and
means for determining said unavailable time interval based on said first unavailable time interval and said second unavailable time interval.

20. The system of claim 15 wherein the communications network is an asynchronous transfer mode (ATM) communications network, the periodically transmitted data packets from both terminating devices are operations administration and maintenance (OAM) cells, said notification message is a remote defect indicator (RDI) cell, and the terminating devices are switching nodes and said controller includes:
a monitoring function for monitoring over said monitoring time interval for arrival of OAM cells for a loss of continuity.

21. A computer readable medium having stored thereon computer-executable instructions for determining availability in a bi-directional segment connecting two terminating devices in a communications network, between the two terminating devices periodically transmitting and receiving data packets, the periodically transmitted data packets being received according to an expected arrival format, the computer-executable instructions comprising:
monitoring a first direction of the segment over a monitoring time interval to detect a change in arrival format of the periodically transmitted data packets from the expected arrival format;
monitoring the first direction to detect a notification message indicating a change in arrival format for the periodically transmitted data packets from the expected format for a second direction of the segment;

detecting an unavailable time interval between the detected change in arrival format from the expected arrival format to a detected change in arrival format back to the expected arrival format for at least one of the first direction and the second direction of the segment;

modifying said unavailable time interval to remove a predetermined interval representing a latency between the change in arrival format and detection of the change in arrival format; and determining an available time interval for the bi-directional segment based on a difference between said monitoring time interval and said modified unavailable time interval.

22. The computer-executable instructions of claim 21 wherein said step of monitoring includes:

monitoring the segment over said monitoring time interval to detect arrival of data packets in a predetermined time interval, wherein the arrival of data packets in said predetermined time interval represents the expected arrival format.

23. The computer-executable instructions of claim 22 wherein said step of monitoring the segment includes:

monitoring the segment over said monitoring time interval to detect arrival of monitoring data packets periodically transmitted from the first terminating device to monitor continuity of the segment.

24. The computer-executable instructions of claim 21 further including:

transmitting a notification message from one of the two terminating devices to the other of the two terminating devices when the arrival format changes from the expected arrival format.

25. The computer-executable instructions of claim 21 wherein said step of monitoring includes:

monitoring the segment at a first terminating device of the two terminating devices to detect a change in arrival format of data packets from a second terminating device of the two terminating devices; and said step of detecting includes:

detecting a second unavailable time interval at said first terminating device for the first direction of the segment on which said second terminating device transmits data packets.

26. The computer-executable instructions of claim 25 wherein said step of monitoring further includes:

monitoring the second direction of the segment at said second terminating device to detect a change in arrival format of data packets from said first terminating device; said method further including:

transmitting a notification message from said second terminating device to said first terminating device when a change in arrival format of data packets from said first terminating device is detected.

27. The computer-executable instructions of claim 26 wherein said step of detecting includes:

detecting a first unavailable time interval at said first terminating device for a the second direction of the segment on which said first terminating device transmits data packets based on said notification message.

28. The computer-executable instructions of claim 27 wherein the step of detecting an unavailable time interval further includes:

determining said unavailable time interval based on said first unavailable time interval and said second unavailable time interval.

29. The computer-executable instructions of claim 21 wherein said step of detecting an unavailable time interval includes:

determining a change latency interval between a time of detection of a change from the expected arrival format and a time of change from the expected arrival format; and determining a restore latency interval between a time of detection of a change of a return to the expected arrival format and a time of change to a return of the expected arrival format;

wherein said latency includes the change latency and the restore latency.

30. The computer-executable instructions of claim 21 further comprising:

determining an availability ratio of said available time interval to said monitoring time interval.

31. The computer-executable instructions of claim 24 wherein the communications network is an asynchronous transfer mode (ATM) communications network, the periodically transmitted data packets from the two terminating devices are operations administration and maintenance (OAM) cells, said notification message is a remote defect indicator (RDI) cell, and the terminating devices are switching nodes and the step of monitoring the segment includes:

monitoring over said monitoring time interval to detect arrival of OAM cells for a loss of continuity.

* * * * *

UNITED STATES PATENT AND TRADEMARK OFFICE
CERTIFICATE OF CORRECTION

| | |
|---|---|
| PATENT NO. | : 7,046,693 B1 |
| APPLICATION NO. | : 09/984700 |
| DATED | : May 16, 2006 |
| INVENTOR(S) | : Darlene Lapointe et al. |

It is certified that error appears in the above-identified patent and that said Letters Patent is hereby corrected as shown below:

Column 10, line 41: "segment for includes" should read --segment includes--
Column 12, line 55: "network, between the" should read --network, the--
Column 14, line 10: "device for a the" should read --device for the--

Claim 3 should read as follows:

Col. 10, Line 39

--3. The method of claim 2 wherein said step of monitoring the segment includes:

monitoring the segment over said monitoring time interval to detect arrival of monitoring data packets periodically transmitted from the two terminating devices to monitor continuity of the segment.--

Claim 24 should read as follows:

Col. 13, Line 27

--24. A computer readable medium having stored thereon computer-executable instructions for determining availability in a bi-directional segment connecting two terminating devices in a communications network, the two terminating devices periodically transmitting and receiving data packets, the periodically transmitted data packets being received according to an expected arrival format, the computer-executable instructions
comprising:

monitoring a first direction of the segment over a monitoring time interval to detect a change in arrival format of the periodically transmitted data packets from the expected arrival format;

monitoring the first direction to detect a notification message indicating a change in arrival format for the periodically transmitted data packets from the expected format for a second direction of the segment;

detecting an unavailable time interval between the detected change in arrival format from the expected arrival format to a detected change in arrival format back to the expected arrival format for at least one of the first direction and the second direction of the segment;

UNITED STATES PATENT AND TRADEMARK OFFICE
CERTIFICATE OF CORRECTION

PATENT NO. : 7,046,693 B1
APPLICATION NO. : 09/984700
DATED : May 16, 2006
INVENTOR(S) : Darlene Lapointe et al.

It is certified that error appears in the above-identified patent and that said Letters Patent is hereby corrected as shown below:

Claim 24 should read as follows: (cont'd)

modifying said unavailable time interval to remove a predetermined interval representing a latency between the change in arrival format and detection of the change in arrival format; and determining an available time interval for the bi-directional segment based on a difference between said monitoring time interval and said modified unavailable time interval.--

Claim 30 should reads as follows:

Col. 14, Line 31

--30. The computer-executable instructions of claim 29 wherein said step of detecting includes:

detecting a first unavailable time interval at said first terminating device for the second direction of the segment on which said first terminating device transmits data packets based on said notification message.--

Signed and Sealed this

Sixth Day of March, 2007

JON W. DUDAS
*Director of the United States Patent and Trademark Office*